Patented Apr. 8, 1930

1,753,205

UNITED STATES PATENT OFFICE

SHINJIRO HORII, OF TOKYO, JAPAN

STENCIL SHEET

No Drawing.   Application filed December 31, 1927.   Serial No. 244,049.

My invention relates to improvements in stencil sheet for use in duplicating manuscript and typewritten documents, drawings and the like, consisting of a sheet of fibrous material coated or impregnated with a coating material which is impermeable to ink and can be stencilized by the pressure of a hand stylus or the impact of the type of a type writing machine.

It has previously been proposed to produce a stencil sheet consisting of a fibrous base having a coating including a gelatinous organic colloid, such as gelatine, an oily tempering agent and an inorganic body, such as highly colloidal clays, capable of dispersion in a medium employed as the extensive dispersion means for the organic colloid.

It has also been proposed to produce such a stencil sheet having a coating of a gelatine or wax composition having in it an insoluble pigment, such as a white titanium pigment.

It has further been proposed to produce a stencil sheet comprising a porous base having a coating including cellulose acetate, in combination with an acetate of starch, a tempering agent, some distenders, such as Turkey red oil, bentonite, powdered soapstone, zinc oxide and zinc stearate, and a coloring agent, such as Prussian blue, or other colored lakes.

According to the present invention, the stencil sheet comprises a fibrous base coated with a coating material including esters of polysaccharides other than cellulose acetate and starch acetate, a tempering agent and an insoluble colloidal substance, the substance being dispersed or suspended in the coating medium. The coated layer of the stencil sheet consists of a homogeneous mixture of the ingredients. The insoluble colloidal substance unites intimately with the tempering or softening agent forming a soft, durable and flexible coating which may be clearly stencilized by the pressure of a writing instrument.

In this connection it may be noted that it has been proposed to produce a stencil sheet of a fibrous base coated with a coating material comprising cellulose, or a near derivative of cellulose deposited from an aqueous medium, such as the coherent products obtained by precipitation of viscose (cellulose xanthogenate solutions), cuprammonium solutions of cellulose, or a solution of cellulose in aqueous solution of zinc chloride, in association with a tempering agent, such as glycerin, glucose syrup and materials insoluble in aqueous media, such as a white titanium pigment and China-clay, forming a disperse system with the cellulose or near derivative, and rendering the coated film sensitive to be cut by a stylus or a typewriting machine. According to the present invention, the film forming component of the stencil sheet consists chiefly of the esters of polysaccharides, other than cellulose acetate and starch acetate, which are insoluble in water, but are soluble in a volatile solvent, such as acetone, ether-alcohol mixture and amyl acetate, and, therefore, the properties of the film thereby produced differ radically from that above described.

In the carrying out of the invention, a sheet of fibrous base, such as Japanese yoshino paper, is coated or impregnated with a coating material prepared by dissolving esters of polysaccharides other than cellulose acetate and starch acetate, such as starch stearate, mannan acetate, cellulose stearate and cellulose nitrate, in any suitable solvents, such as acetone, ethyl alcohol, amyl alcohol, ethyl acetate, butyl acetate, benzine, benzol, toluol or a mixture of them, and then mixing therewith fine particles of an insoluble colloidal substance, such as aluminum tannate, aluminum hydroxide, titanium white, or kaolin in admixture with a tempering or softening agent, such as hydrocarbon oils, fatty oils, fats, fatty acids, naphthenic acid, naphthenic acid glycerides, triacetin, ethyl phthalate, butyl phthalate, amyl phthalate, butyl tartrate, triphenyl phosphate and tricresyl phosphate, or other fatty or greasy material, and then to mix thoroughly with the solution of polysaccharides. It is also found to be advantageous to dye the insoluble colloids with a colloidal coloring matter to exert a protective action of the suspensoid.

The coating material may also be added into the paper stuff in a mixing hollander during the paper making operation.

The proportions of the ingredients of the composition may vary according to several circumstances. The following is an example:—

| | Parts by weight |
|---|---|
| Cellulose nitrate | 10 |
| Acetone | 20 |
| Ethyl acetate | 20 |
| Ethyl alcohol | 20 |
| Amyl acetate | 30 |
| Aluminum hydroxide | 10 |
| Aluminum tannate | 5 |
| Methyl violet | 2 |

The term "esters of polysaccharides" is intended to include not only one of definite esters of polysaccharides, but also a mixture of them.

What I claim is:—

1. A stencil sheet adapted for stencilizing by pressure, comprising a base of fibrous material coated with a coating material, consisting of a solution of esters of polysaccharides, other than cellulose acetate and starch acetate, which are insoluble in water, in admixture with a tempering agent, and aluminum hydroxide, the latter being dispersed in the solution forming a homogeneous suspensoid.

2. A stencil sheet adapted for stencilizing by pressure, comprising a base of fibrous material coated with a coating material, consisting of a solution of esters of polysaccharides, other than cellulose acetate and starch acetate, which are insoluble in water, in admixture with a tempering agent, and aluminum tannate, the latter being dispersed in the solution forming a homogeneous suspensoid.

3. A stencil sheet adapted for stencilizing by pressure, comprising a base of fibrous material coated with a coating material, consisting of a solution of esters of polysaccharides, other than cellulose acetate and starch acetate, which are insoluble in water, in admixture with a tempering agent, and a mixture of aluminum hydroxide and aluminum tannate, said mixture being dispersed in the solution forming a homogeneous suspensoid.

In testimony whereof I affix my signature.

SHINJIRO HORII.